(12) United States Patent
Garner

(10) Patent No.: US 6,501,462 B1
(45) Date of Patent: Dec. 31, 2002

(54) ERGONOMIC TOUCH PAD

(75) Inventor: Jason T. Garner, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/346,373

(22) Filed: Jul. 1, 1999

(51) Int. Cl.[7] .................................................. G09G 5/08
(52) U.S. Cl. ...................... 345/173; 345/157; 178/18.01
(58) Field of Search ................................. 345/169, 156, 345/157, 168, 166, 163, 173; 341/22; 178/17 C, 18.04, 18.06, 19.01, 19.03, 18.01, 18.02, 18.03, 18.05, 18.07

(56) References Cited

U.S. PATENT DOCUMENTS

| | | |
|---|---|---|
| 4,736,191 A | 4/1988 | Matzke et al. |
| 5,302,948 A | 4/1994 | Lau et al. |
| D370,534 S | 6/1996 | Hunger et al. |
| D375,492 S | 11/1996 | Chung |
| D388,774 S | 1/1998 | Giuntoli |
| D389,129 S | 1/1998 | Guintoli |
| D390,211 S | 2/1998 | Yates et al. |
| 5,914,702 A * | 6/1999 | Derocher et al. ........... 345/157 |

* cited by examiner

*Primary Examiner*—Bipin Shalwala
*Assistant Examiner*—Mansour M. Said
(74) *Attorney, Agent, or Firm*—Scott Charles Richardson; Richard P Gilly; Wolf Block Schorr & Solis-Cohen LLP

(57) ABSTRACT

An input control device (21, 121, 221) includes a touchpad (25, 125, 225) located near an associated keyboard (23, 123) for use with a computer-related apparatus (120). The touchpad (25, 125, 225) is positioned so that it can be reached by the user's thumbs (40) during normal operation of the associated keyboard (23, 123). The location of the touchpad (25, 125, 225) is such that a ridge (39, 139) protruding near the edge of the touchpad (25, 125, 225) is encountered by the user's thumbs (40) both when moved inadvertently during normal typing operations and when intentionally moved toward the touchpad (25, 125, 225). In this way, the ridge (39, 139) signals the boundary with the touchpad (25, 125, 225) so that the user can proceed to activate it if desired, or can avoid activating it if not desired.

20 Claims, 2 Drawing Sheets

ERGONOMIC TOUCH PAD

FIELD OF THE INVENTION

This invention relates to input devices for computer-related apparatus, and, more particularly, to an improved ergonomic touchpad for use in conjunction with such apparatus.

BACKGROUND

Touchpads or touch screens often serve the same input and navigation functions in computers as the so-called "mouse." Touchpads generally include a planar, generally rectangular input surface and a pair of control keys below the input surface. The input surface of the touchpad generally has capacitive or resistive sensors or other means for detecting the presence of a fingertip or other pointing object against or near the surface.

To perform the functions typically associated with a mouse, the user moves a stylus or his or her finger about the input screen which generally causes a cursor to move to corresponding positions on the display screen of a computer or computer-related apparatus. Tapping the display screen itself may correspond to "clicking" of a mouse button, thus selecting an element or command at which the cursor is positioned. Alternately, the two control keys of the touchpad can be used to select objects or commands, and the input surface can be used to drag or relocate the cursor in combination with the activation of the control keys.

Touchpads are especially prevalent in portable computers or other applications where it is uncertain whether a flat surface suitable for operating a mouse will be available. Increasingly, however, touchpads are available as add-on features or integral components of standard computer keyboards. U.S. Pat. No. D375,492 shows one such touchpad integrated into the chassis of a full-sized keyboard for a stand-alone computer.

Touchpads are often located below associated keyboards or keypads, that is, when the keypad is positioned for normal operation by the user, the touchpad is located between the user and the keypad or keyboard. If the keyboard is suitably close to the touchpad, the user can extend a finger from the keyboard, generally the thumb from the spacebar, and contact the touchpad with the finger. This arrangement, while it has the advantage of potentially keeping the user's hands in a normal typing position while accessing the touchpad, has various drawbacks and disadvantages. Chief among the drawbacks is the following: normal operations on the keyboard involve rapid and frequent movements and "reaches," especially when alphanumeric data is being entered. It is natural during operation of the keypad or keyboard by the user's typing fingers for the user's thumb to also involuntarily shift position during the course of such operation. Sometimes, inadvertent movements of the thumb during operation of the main keyboard cause the thumb to unintentionally contact the touchpad, thus performing an unintended operation in the course of another application.

Such unintended activation of the touchpad may open windows or execute time-consuming commands, both of which would interrupt the currently-displayed application. The execution of such commands or the opening of such windows is, at best, an inconvenience when operating a standard, stand-alone personal computer or when working with a state-of-the-art workstation. The unwanted execution of additional commands and the unintentional opening of additional windows can be even more frustrating when it occurs in the context of a portable personal computer running on batteries, where execution times are often slowed due to power constraints.

The space constraints on the keyboard and on the other input controls of a portable computer often require the touchpad to be located even closer to the user's hands, particularly to his or her thumbs. As such, the opportunity for inadvertent touchpad activation is greatest in those computer environments, i.e., portable computers, in which touchpads are most prevalent.

Inadvertent activation of the touchpad is more likely to occur when the user is typing furiously or otherwise working rapidly with the main keyboard. During such power typing or rapid data entry, it is often the case that the user is focusing the majority of his or her attention on the data to be inputted, rather than on the display screen. Under such circumstances, inadvertent activation of the touchpad may not be detected for long periods of time, if ever. When the display is not being watched, even a seemingly harmless, unintentional command, like relocating the cursor, can have drastic consequences. Only when the user has finished his or her task and is proofreading or otherwise reviewing the final product will the user be confronted with inexplicable data corruption, including data loss, random insertions, or scrambling of data, all of which occurred during the course of seemingly normal operation of the keyboard. Such occurrences are obviously not only a waste of time, but can border on the infuriating, especially when combined with the time pressures which required the fast-paced data entry to begin with.

One way of avoiding the above-described drawbacks is to distance the touchpad from the keyboard or other input device. Such a solution, however, vitiates the advantages of the user's being able to access the touchpad without needing to remove his or her hands from the keyboard. Thus, operation of such a "remote" touchpad is more time-consuming than need be, requiring the user to interrupt the flow of text or data entry being accomplished on the main keyboard. Furthermore, it is not always possible for a user to distance the touchpad from the keyboard, such as with a portable computer, or when the touchpad is otherwise integral with the keyboard.

The increasing prevalence of portable computers means that they are more likely to be carried and used in low-light situations. Because touchpads of the current art are generally in substantially the same plane as the working surfaces of the keyboard chassis, it is sometimes not easy for a user's fingers to locate touchpads in reduced-light situations. This, again, makes operation of the associated computer more difficult in such environments.

There is thus a need to improve the ergonomics of touchpads used in association with keypads, keyboards or other input devices.

There is a corresponding need to optimize the location of the touchpad so it can be accessed during normal operation of a keypad, but without undesirable, unintended activation of such touchpad.

SUMMARY OF THE INVENTION

An input device has a touchpad located near a corresponding keyboard. The touchpad has a ridge protruding from the plane of the touchpad and extending near the edge of the touchpad. The touchpad is located relative to the keyboard so that the ridge is likely to be encountered by the user's fingers nearest the touchpad, typically the thumbs. As such, the ridge provides tactile feedback, that is, the ridge signals the boundary of the touchpad either to facilitate its activation or to inhibit inadvertent activation thereof.

In one aspect of the invention, the likely locations of the user's thumbs during operation of the keyboard define a first ergonomic zone, while the "reach" of the user's thumbs when other fingers are in position over the keyboard constitutes a second ergonomic zone. There is an overlap in the boundaries of these two ergonomic zones and the touchpad is located so that its edge extends at least partially within this overlap zone. In this way, the ridge of the present invention and its advantageous signaling functions are likely to be encountered during normal operations of the input control device.

In accordance with still another aspect of the current invention, the touchpad is either rectangular or triangular. The touchpad can be integrally mounted with the associated keyboard in a chassis.

In yet another aspect of the present invention, the touchpad is part of a portable computer.

BRIEF DESCRIPTION OF THE DRAWINGS

The invention will be better understood by reference to the attached drawing. It is understood that the drawing is for illustrative purposes only and is not necessarily drawn to scale. In fact, certain features of the drawing are shown in more detail for purposes of explanation and clarification.

DESCRIPTION OF THE PREFERRED EMBODIMENTS

Figure 1:
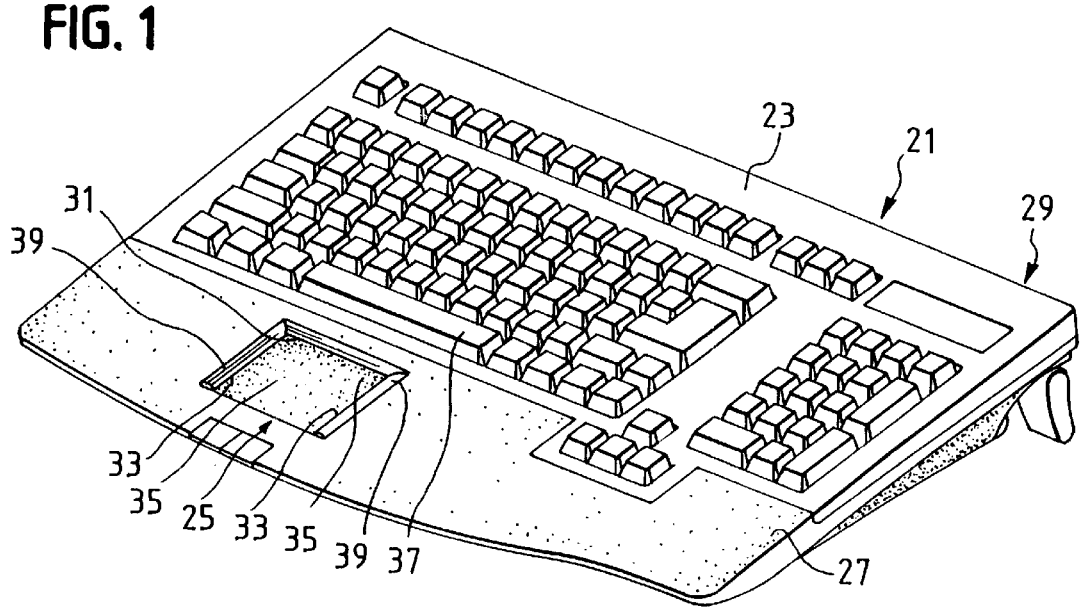
FIG. 1 is a perspective view of an input control device according to the present invention.
Figure 2:
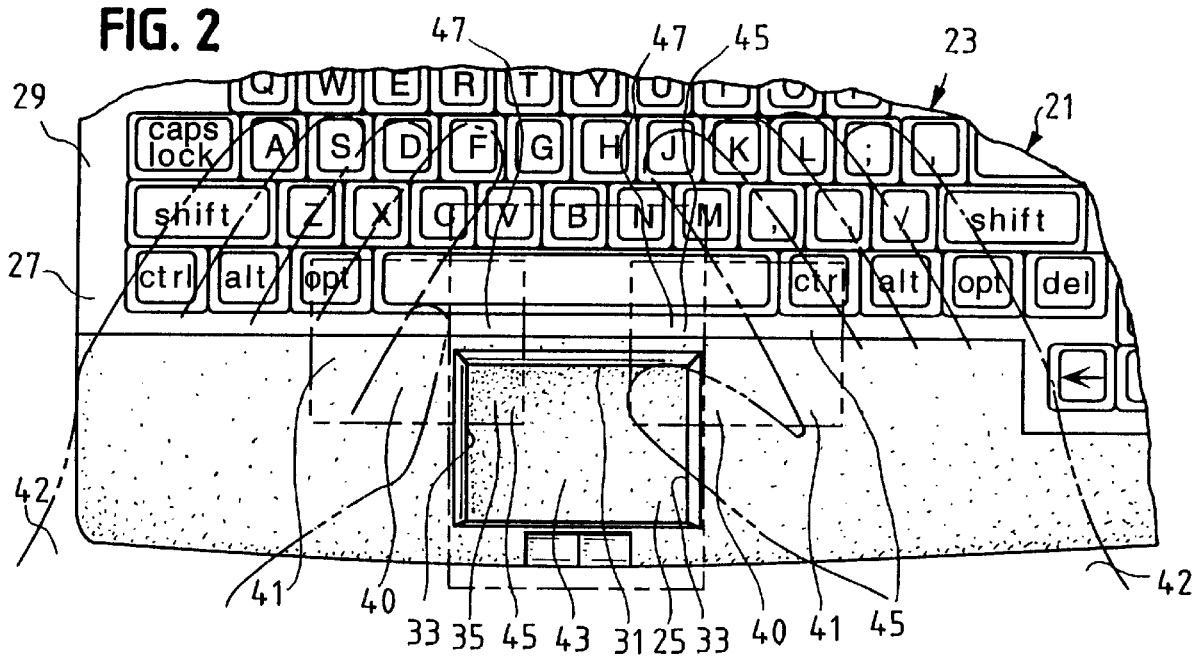
FIG. 2 is a top plan view of the device of FIG. 1.
Figure 3:
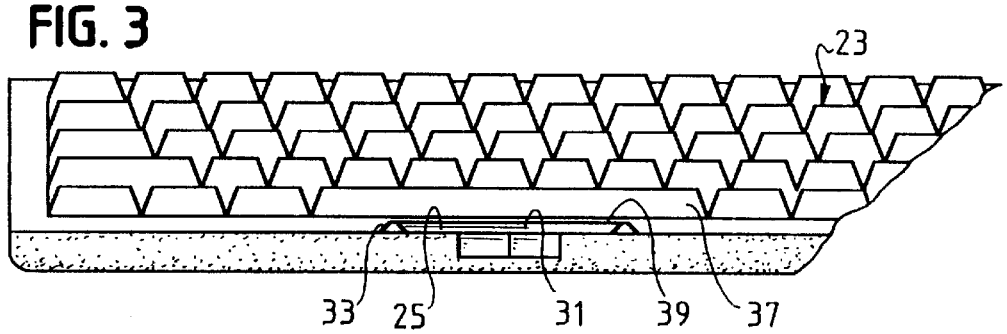
FIG. 3 is a side elevational view of the device of FIG. 1.

Referring now to the drawing, and in particular to FIGS. 1–3, an input control device 21 for a computer comprises a set of input controls arranged into a full keyboard 23 and a touchpad 25. The touchpad 25 and keyboard 23 are secured to a substantially planar surface 27 of a chassis 29. The touchpad 25 and keyboard 23 are located near each other, and preferably are located in operative proximity relative to each other, that is, the touchpad 25 is relatively easily reached by at least one finger of the user's hands without significant movement of the user's hands from their normal operating positions above keyboard 23.

Touchpad 25 has a rectangular shape with a front edge 31, side edges 33, and front corners 35 at the intersection of the front and side edges. As best seen in FIG. 2, front edge 31 and front corners 35 are located proximate to the user's thumbs 40 when the user's hands 42 are positioned normally on keyboard 23. In this way, when the user seeks to activate touchpad 25, the user generally merely extends the thumb 40 from its position near space bar 37 toward touchpad 25. In FIG. 2, the left thumb 40 is at rest, while the right thumb 40 is reaching for touchpad 25. It will be appreciated that when the user contacts touchpad 25 in this manner, touchpad 25 has suitable circuitry for responding to such contact and transmitting corresponding signals to the computer or computer-related apparatus.

Significantly, a ridge 39 is defined proximate to front edge 31 of touchpad 25, and preferably extends substantially along front edge 31 and side edges 33. Ridge 39 protrudes from the plane of touchpad 25 to provide several advantageous functions. First, ridge 39 provides tactile feedback to the user when the ridge 39 is contacted by the user's thumbs 40. Such tactile feedback signals the boundary with touchpad 25 and thus informs the user of the position of touchpad 25 so that the user can activate the touchpad 25 if desired, or avoid activating it if not desired. The tactile feedback also means that touchpad 25 can be found without looking for it with the eye, or in reduced light situations. Second, in the event that typing on the main keyboard causes thumb 40 to extend over touchpad 25, and also causes such thumb to "twitch" or otherwise move downward toward touchpad 25, ridge 39 may be contacted during such downward movement instead of touchpad 25. Ridge 39 thus blocks unintended activation by inadvertent downward movements of thumbs 40 when over touchpad 25. Third, the upper edge of ridge 39 itself serves as a "safe harbor" where the thumbs can rest during operation of the keyboard. Such "safe" place to rest the thumbs avoids many of the unintended movements of the thumbs which would otherwise arise when the thumbs are merely dangling in the air during typing.

In the preferred embodiment, touchpad 25 is centered relative to keyboard 23, that is, it is evenly spaced from the user's thumbs 40. It can thus be accessed equally by either hand. In the embodiment illustrated in FIGS. 1–3, touchpad 25 is positioned below keyboard 23 when input control device 21 is in its normal orientation for use.

The position of touchpad 25 relative to keyboard 23 is selected to optimize ergonomic characteristics of input control device 21. For example, when a user touch-types on keyboard 23, thumbs 40 are generally at rest at or near spacebar 37, as is the left thumb in FIG. 2. Nonetheless, for most people, movement of one's typing fingers, especially when reaching for different keys on keyboard 23, still causes unconscious or inadvertent movements of thumbs 40. A first ergonomic zone 41 corresponds to those movements. More technically, first ergonomic zone is positioned on planar surface 27 and comprises the locus of positions which the finger closest to touchpad 25 (in this embodiment, thumb 40) is likely to occupy without conscious effort during normal operation of the keyboard 23. Otherwise stated, while the user is working keyboard 23 and not using touchpad 25, the user's thumbs 40 are located at the positions which define or lie within first ergonomic zone 41.

When operating keyboard 23, it is preferable for a user to keep his or her typing fingers in the normal operating position as much as possible so that data can be manipulated and inputted most efficiently. To that end, it is ergonomically desirable for the user to reach for input controls such as touchpad 25 with the closest available finger, while leaving the other fingers in the normal operating position. In the embodiment illustrated in FIGS. 1–3, the user can reach toward touchpad 25 with thumbs 40 by certain amounts without needing to move other fingers from their normal operating position over keyboard 23. A second ergonomic zone 43 corresponds to this reach of thumbs 40. More technically, second ergonomic zone 43 is located on surface 27 and comprises the locus of positions which are accessible by the finger or fingers closest to touchpad 25 (such as thumbs 40), when such fingers are actively seeking to reach touchpad 25, but without moving hands 42 from their normal operating position above keyboard 23. Otherwise stated, when the user is working with keyboard 23 and desires to activate touchpad 25, second ergonomic zone 43 corresponds to the "reach" of the fingers which activate touchpad 25 without moving the user's hands from keyboard 23.

As seen in FIG. 2, ergonomic zones 41, 43 have overlapping boundaries which define overlap zones 45. In ergonomic terms, overlap zones 45 include a subset of positions that thumbs 40 may occupy merely by inadvertent movements of thumbs 40 while operating keyboard 23 and also positions within reach of thumbs 40 when the user interrupts operation of keyboard 23 to activate touchpad 25, but without substantially moving hands 42 from keyboard 23. Corners 35 of touchpad 25 are included within overlap zones 45.

Significantly, touchpad 25 is positioned so that its front and side edges 31, 33 have portions located in overlap zones 45. This ergonomic location of edges 31, 33 means that, for most users, ridge 39 described above is likely to be encountered both during inadvertent movements of thumbs 40 and during conscious "reaching" of thumbs 40. In either set of circumstances, ridge 39 serves the ergonomic function of signaling to the user the boundary of touchpad 25. The location of ridge 39 in overlap zones 45 also allows it to serve as a "safe harbor" on which thumbs 40 may rest, thereby reducing the frequency of inadvertent movements of thumbs 40. Furthermore, because ridge 39 traverses the overlap zones 45, it is in a more likely position to contact thumbs 40 when they are inadvertently moving downwardly, thus preventing unwanted contact with touchpad 25.

The operation of the present invention is apparent from the foregoing description. While typing on the keyboard 23, the user may inadvertently encounter ridge 39 and in response thereto, the user may withdraw the inadvertently encroaching thumb 40. When the user wishes to contact touchpad 25, the tactile feedback provided by ridge 39 helps the user find the touchpad 25. The upper surface of ridge 39 serves both as a resting place or thumbrest for the thumbs and as a barrier to prevent downward thumb movements from activating the touchpad 25.

Figure 4:
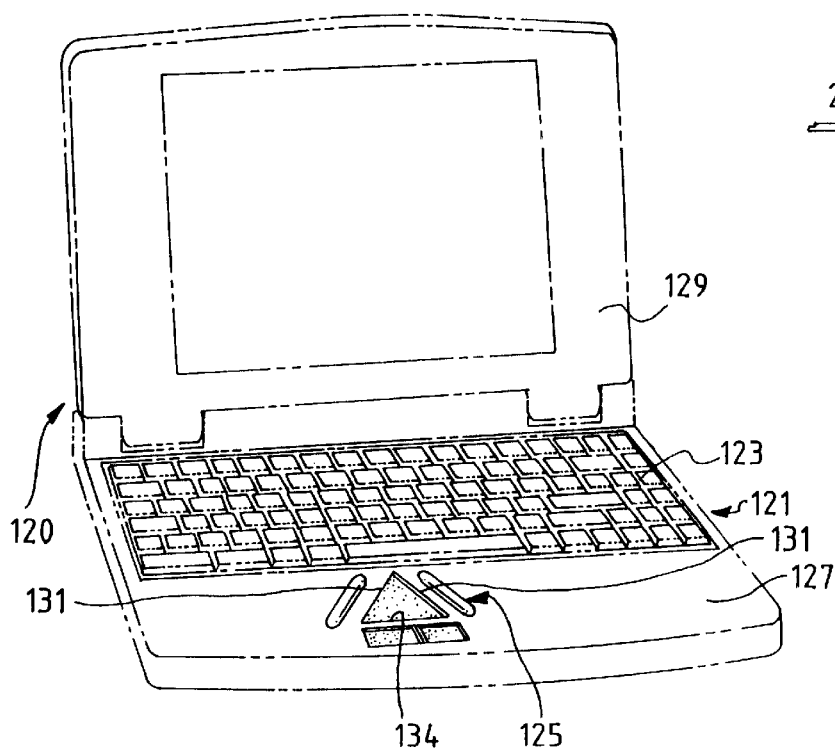
FIG. 4 is a perspective view of a second embodiment of the present invention.
Figure 5:
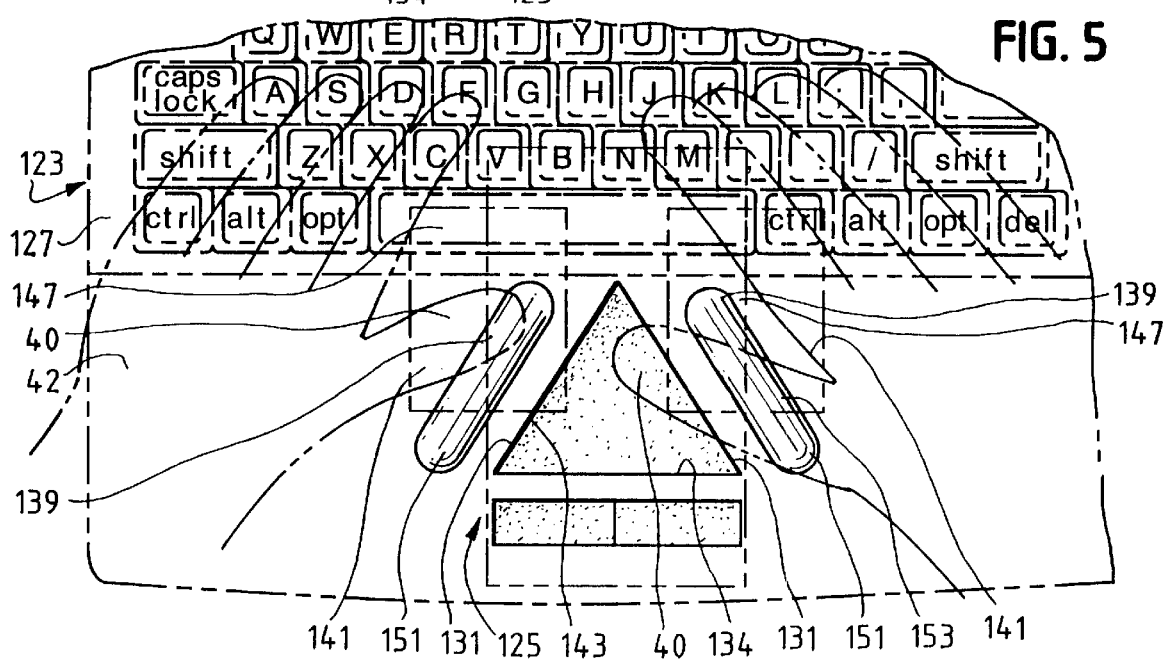
FIG. 5 is a top plan view of the device of FIG. 4.
Figure 6:
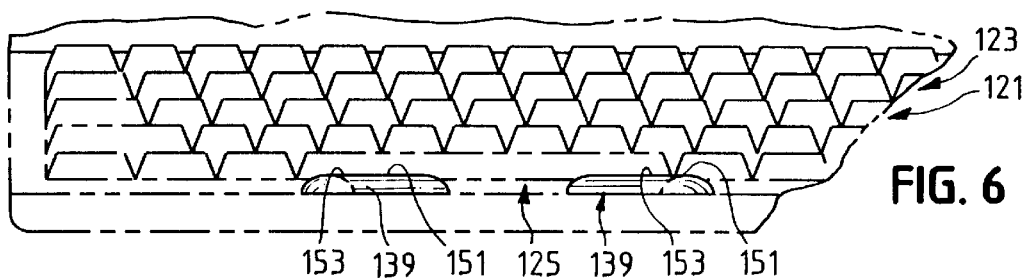
FIG. 6 is a side elevational view of the device of FIG. 4.

Although FIGS. 1–3 illustrate the present invention in the context of an input control device 21 for a computer, the present invention has application when a touchpad is used in conjunction with any other set of input controls on any of a variety of computer-assisted or computer-related devices. One such alternative embodiment is shown in FIGS. 4–6, in which touchpad 125 is integrated with keyboard 123 on a portable computer 120. As in the previous embodiment, first and second ergonomic zones 141, 143 are defined on planar surface 127 and correspond, respectively, to inadvertent and intentional movements of the finger(s) likely to activate touchpad 125. Overlap zones 145 are also defined as the intersection of zones 141, 143.

In this embodiment, however, touchpad 125 has a triangular shape, and two ridges 139 extend substantially along the two, forward edges 131 in a "V" shape. Forward edges 131 are preferably the equal legs of an isosceles triangle with the apex centered with respect to keyboard 123.

In this embodiment, ridges 139 have an upper surfaces 151 defined at respective upper edges 153 of ridges 139. Upper surfaces 151 are above the planar surface 127 and that of touchpad 125. The dimensions of upper surfaces 151 are sufficient so that the user's thumbs 40 (FIG. 5) can be substantially disposed on a corresponding portion of upper surfaces 151. As such, ridges 139 provide wider, more comprehensive surfaces on which to rest the thumbs 40.

The triangular shaped touchpad 125 is operated in much the same manner as the touchpad 25 discussed above. As best seen in FIG. 5, however, the triangular shape has the advantage of minimizing the area of the touch pad which is likely to be inadvertently contacted by the user's thumbs 40. In ergonomic terms, there is less touchpad area within overlap zone 147 when the touchpad is triangular than when it is rectangular, which means there are fewer opportunities for inadvertent activation of touchpad 125.

The exact dimensions of touchpad 25, 125 and its position relative to keyboard 23, 123 depend, in part, on the corresponding size of the keys of keyboard 23, 123. One suitably sized touchpad 125 has forward edges 131 extending about two inches from a base 134 of about 2½ inches. Ridges 139 extend about 1¾ inches from the apex of triangular touchpad 125 and along edges 131. Upper surface 151 has a lateral dimension of about 0.5 inches.

Rectangular touchpad 25 is about 2¾ inches in length and 1¾ inches in width or depth. The height of ridge 39, 139 is preferably sufficient to be sensed when contacted by the user's thumbs 40. A height of ⅛ inch has been found suitable.

Various additional alternative embodiments can be devised and are likewise within the scope of the present invention. For example, ridges 39, 139 can be retractably mounted to corresponding planar surfaces 27, 127. In particular, ridges 39, 139 can be spring-biased to their upwardly extending position. When this construction is used in the context of the notebook computer 120, display screen 129 folds over and contacts upper surface 151 of ridge 139, and such contact causes ridge 139 to retract.

Figure 7:
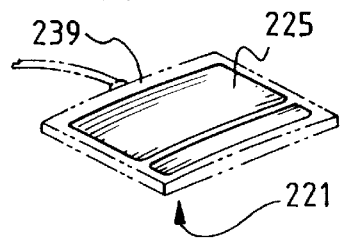
FIG. 7 is a perspective view of a third embodiment of the present invention.

Still another alternate embodiment is shown in FIG. 7, in which input control device 221 has a touchpad 225 according to the present invention configured as an add-on device for a preexisting input control device (not shown). Touchpad 225 in this embodiment is moved so as to be in operative proximity to the preexisting input control device. As such, the ergonomic advantages of touchpad 225 can be appreciated even when used with preexisting input control devices.

In addition to the advantages apparent from the foregoing description, the input control device of the present invention facilitates intentional activation of the associated touchpad while inhibiting unintentional activation thereof.

By avoiding inadvertent activation of the touchpad, the present invention also has the advantage of avoiding corruption, scrambling, loss or delay associated with the input of data.

A corresponding advantage is that the touchpad of the present invention is easier to use and harder to misuse.

The tactile feedback of the ridge of the present invention makes it easier to find the touchpad without looking, or when in reduced light situations.

Still another advantage is that the ergonomics of the input control device and associated computer-related apparatus are improved, and the all-too-frequent frustrations and inconveniences associated with operating such devices are diminished.

It is understood that the above-described preferred embodiments are but several illustrations of the present invention, and that alternative embodiments may be devised by those of ordinary skill in the art. Such alternatives, as well as others which skill or fancy may suggest, are considered to fall within the scope of the current invention, which is solely defined by the claims appended hereto.

What is claimed is:

1. An input device for a user of a computer, the device comprising:

a chassis;

a set of input controls secured to the chassis;

a touchpad secured to the chassis in operative proximity to the set of input controls, the chassis having a substantially planar region proximate to the touchpad;

at least one finger movable to activate the touchpad when the user's hand is positioned on the input controls for normal operation thereof;

a first ergonomic zone defined relative to the input controls and the touchpad and comprising the locus of positions naturally occupied by the one finger during normal operation of the input controls by the user's other fingers;

a second ergonomic zone defined relative to the first zone and comprising the locus of points accessible by the one finger when seeking to activate the touchpad during normal operation of the input controls by the user's other fingers, the first and second ergonomic zones having partially overlapping boundaries to define an overlap zone, the touchpad having an edge portion extending in the overlap zone;

a ridge protruding from the plane of the planar region of the chassis, the ridge extending proximate to the edge portion of the touchpad, the ridge being sufficiently sized to provide tactile feedback to the user when the ridge is contacted by the one finger, the ridge thereby signaling the edge portion of the touchpad to facilitate desired activation of the touchpad and inhibit inadvertent activation thereof.

2. The device of claim 1, wherein the input controls comprise a keypad and the touchpad is rectangular with forward and side edges, the edge portion corresponding to at least one of the forward edge and the side edges.

3. The device of claim 1, wherein the input controls are located in the chassis further from the user than the touchpad when the chassis is oriented for use, the touchpad being accessible by the user's thumb during normal operation of the input controls.

4. The device of claim 3, further comprising an upper surface defined in the upper edge of the ridge, the upper surface being sufficiently sized to rest the user's thumb thereon, and wherein the touchpad is triangular, one corner of the triangle pointing toward the keyboard.

5. An ergonomic device for manipulating a cursor on a display screen of a computer-related apparatus, the device comprising:

a planar touchpad located proximate to a planar region of the keyboard, the touchpad having a first edge located proximate to the user's thumbs when the user's hands are positioned normally on the keyboard, the first edge defining a boundary between the touchpad and the keyboard;

means responsive to contact against the touchpad for transmitting signals to the computer-related apparatus;

a ridge defined proximate to the first edge of the touchpad and protruding from the plane of the planar region of the keyboard to provide tactile feedback to the user when the ridge is contacted by the user's thumbs, the ridge signaling the boundary of the touchpad to facilitate desired activation of the touchpad and inhibit inadvertent activation thereof.

6. The device of claim 5, wherein the ridge extends substantially along the first edge of the touchpad.

7. The device of claim 6, wherein the touchpad is rectangular and has second and third edges, the first, second and third edges corresponding to the front, left and right sides of the touchpad, respectively.

8. The device of claim 5, wherein the touchpad is in the shape of a triangle.

9. The device of claim 5, wherein the touchpad is secured relative to the keyboard.

10. The device of claim 5, wherein the touchpad lies in substantially the same plane as the keyboard.

11. The device of claim 10, wherein the touchpad and the keyboard are integrated into a single unit.

12. The device of claim 11, wherein the touchpad is located on the unit so as to be evenly spaced from the user's thumbs when the user's hands are in the normal position on the keyboard.

13. The device of claim 11, wherein the unit containing the touchpad comprises a portion of a portable computer.

14. The device of claim 11, wherein the unit containing the touchpad comprises a keyboard chassis of a personal computer.

15. The device of claim 5, further comprising an upper surface formed at the upper edge of the ridge, the upper surface extending substantially parallel to the plane of the touchpad a sufficient distance to define thumbrests for the user's hands.

16. The device of claim 5, wherein the ridge is retractably mounted relative to the touchpad, whereby force exerted on the upper edge of the ridge toward the touchpad causes the upper edge to approach the plane of the touchpad.

17. In a portable computer having a keyboard and a display, in which the keyboard is defined on a user-accessible, substantially planar surface of the computer, the improvement comprising:

a first ergonomic zone on the planar surface and defined by the locus of positions naturally occupied by the user's thumbs when the thumbs are at rest and the user's other fingers are operating the computer in the normal operating position;

a triangular touchpad extending on the substantially planar surface, the triangular pad having a rear edge corresponding to the base of the triangle and forward edges corresponding to the legs of the triangle;

a second ergonomic zone on the planar surface defined by the locus of positions accessible by the user's thumbs when seeking to activate the touchpad with the thumbs during normal operating of the keyboard by the user's other fingers, the first and second ergonomic zones having partially overlapping boundaries to define an overlap zone, the forward edges of the touchpad extending in the overlap zone;

a ridge protruding from the substantially planar surface and having a top edge above the plane of the touchpad, the ridge extending in the overlap zone proximate to the forward edges, the ridge being large enough to be detected by the user's thumbs when in contact therewith;

the detection of the ridge by the user's thumbs inhibiting inadvertent movement of the user's thumbs from the first ergonomic zone toward the second ergonomic zone, whereby incidents of unintended activation of the touchpad by the user's thumbs are minimized.

18. The device of claim 17, wherein the ridge extends substantially along the forward edges.

19. The device of claim 17, further comprising an upper surface formed at the upper edge of the ridge, the upper surface extending substantially parallel to the planar surface a sufficient distance to define thumb rests for the user.

20. The device of claim 17, wherein the ridge is retractably mounted relative to the planar surface, whereby force exerted on the upper edge of the ridge toward the planar surface causes the ridge to be received therein.

* * * * *